United States Patent
Hong

[11] Patent Number: 6,011,645
[45] Date of Patent: Jan. 4, 2000

[54] EDFA FOR AMPLIFYING TRANSMITTED LIGHT BY DIVIDING AN EXCITING PUMP POWER IN TWO DIRECTIONS

[75] Inventor: Mi-Young Hong, Gumi, Rep. of Korea

[73] Assignee: SamSung Electronics Co., Ltd., Kyungki-do, Rep. of Korea

[21] Appl. No.: 08/892,717

[22] Filed: Jul. 15, 1997

[30] Foreign Application Priority Data

Jul. 15, 1996 [KR] Rep. of Korea ...................... 96/28586

[51] Int. Cl.⁷ .................................................. G02F 1/35
[52] U.S. Cl. .......................... 359/341; 359/134; 359/160; 359/337
[58] Field of Search .................... 359/134, 160, 359/161, 337, 341

[56] References Cited

U.S. PATENT DOCUMENTS

| | | |
|---|---|---|
| 5,185,826 | 2/1993 | Delavaux . |
| 5,191,628 | 3/1993 | Byron . |
| 5,280,383 | 1/1994 | Federic et al. ........................... 359/341 |
| 5,299,055 | 3/1994 | Yoneyama . |
| 5,355,248 | 10/1994 | Hadjifotiou . |
| 5,400,166 | 3/1995 | Huber . |
| 5,430,572 | 7/1995 | DiGiovanni et al. . |
| 5,455,704 | 10/1995 | Mizuochi et al. . |
| 5,457,568 | 10/1995 | Jacobovitz-Vesslka et al. . |
| 5,475,529 | 12/1995 | Takatu et al. . |
| 5,506,723 | 4/1996 | Junginger . |
| 5,510,926 | 4/1996 | Bayart et al. . |
| 5,546,221 | 8/1996 | Harasawa . |
| 5,561,552 | 10/1996 | Shibuya . |
| 5,563,732 | 10/1996 | Erdogan et al. . |
| 5,563,733 | 10/1996 | Mitsuda et al. . |
| 5,596,448 | 1/1997 | Onaka et al. ............................. 359/337 |
| 5,598,491 | 1/1997 | Ohya et al. . |
| 5,623,362 | 4/1997 | Mitsuda et al. . |
| 5,717,510 | 2/1998 | Ishikawa et al. ........................ 359/161 |

FOREIGN PATENT DOCUMENTS

| | | |
|---|---|---|
| 9629627 | 9/1996 | Japan . |
| 2315361 | 1/1998 | United Kingdom . |

OTHER PUBLICATIONS

Nishimura et al, OFC '96, vol. 2, pp. 200 Feb. 25–Mar. 1, 1996. abstract only herewith.
Park et al, ICC '95, p. 1985, Jun. 22, 1995, abstr. only herewith.

*Primary Examiner*—Nelson Moskowitz
*Attorney, Agent, or Firm*—Robert E. Bushnell, Esq.

[57] ABSTRACT

An erbium doped fiber amplifier having one pumping source which outputs pump power so as to excite a light signal, the amplifier including: a first erbium doped fiber for receiving an excitation light signal input from the pumping source, and amplifying a transmitted light signal input from an input stage; a first wavelength division multiplexer located at an output of the first erbium doped fiber, for inputting the excitation light signal input from the pumping source to the first erbium doped fiber, the first multiplexer also receiving the transmitted light signal amplified from the first erbium doped fiber and outputting it to a next stage; a dispersion compensation fiber at an output of the first wavelength division multiplexer for compensating for loss caused due to the dispersion characteristics of the transmitted light signal; a second wavelength division multiplexer located at an output of the dispersion compensation fiber, for receiving the input transmitted light signal and the excitation light signal input from the pumping source at two input terminals and inputting the two signals to a second erbium doped fiber; and the second erbium doped fiber located at an output of the first wavelength division multiplexer for amplifying the transmitted light signal with the excitation light signal input.

5 Claims, 5 Drawing Sheets

EDFA FOR AMPLIFYING TRANSMITTED LIGHT BY DIVIDING AN EXCITING PUMP POWER IN TWO DIRECTIONS

CLAIM OF PRIORITY

This application makes reference to, incorporates the same herein, and claims all benefits accruing under 35 U.S.C. §119 from an application for EDFA FOR AMPLIFYING TRANSMITTED LIGHT BY DIVIDING AND EXCITING PUMP POWER IN TWO DIRECTIONS earlier filed in the Korean Industrial Property Office on the 15$^{th}$ day of Jul. 1996 and there duly assigned Ser. No. 28586/1996, a copy of which application is annexed hereto.

BACKGROUND OF THE INVENTION

1. Field of the Invention

The present invention relates to optical communications and, more particularly, to an erbium doped fiber amplifier (EDFA) having a different structure of an optical portion using an excitation light source for amplifying an input light signal.

2. Description of the Related Art

Generally speaking, when an electric signal is converted into a light signal at the transmission stage and sent to an intended place via fiber optics, that is, a transmission medium, the EDFA amplifies the light signal weakened by a predetermined distance so as to transmit it as a stable signal. The EDFA is installed at the transmission/reception stage for the purpose of power amplification and pre-amplification. In an earlier single pumping amplifier, the input connector connects an external fiber optic cable to a internal fiber optic cable of the EDFA. A separation tap for separating a light signal input via the fiber optic cable connected by the input connector at a predetermined ratio splits the input light signal, and inputs the split signals to a photodiode and an optical isolator. Here, the photodiode monitors the magnitude of the light signal input. The optical isolator has one input terminal and one output terminal so that it passes the light signal proceeding to the output terminal from the input terminal within a predetermined wavelength, and interrupts the light signal returning back from the output terminal to the input terminal. By doing so, the optical isolator interrupts the reverse flow of amplified spontaneous emission (ASE) generated from behind erbium doped fiber (EDF) so as to prevent the input light signal from being distorted. The light signal output from the optical isolator is input to a wavelength division multiplexer (WDM). The WDM receives two different wavelengths of light signal via two different input ports, and outputs them via one fiber optic end. Here, the wavelength of the light signal input is 1,550 nm, the wavelength of the excitation light source being 980 or 1,480 nm. Via the output terminal of the WDM, the excitation light source of a wavelength of 980nm and the input light signal of 1,550 nm are fed to the EDF 16. The EDF is made with erbium (element number 68), a rare-earth metal, added to a fiber optic cable, and having a high absorption rate at specific wavelengths such as 800, 980 and 1,480 nm. It amplifies the input light signal, having a spectrum which diverges with a bandwidth of about 30 nm at a predetermined wavelength (1,550 nm). The output end of the EDF is connected to an second optical isolator which is, then connected to a second tap. The tap is connected to the output stage fiber optic cable by the output connector. Here, the second optical isolator interrupts the light signal reflected back from the tap or the connection of the output connector. The second tap receives the light signal output from the second optical isolator, and splits it into a light signal output to the fiber optic cable connected via the output connector and a light signal for monitoring the output light signal. The monitoring light signal is monitored by a second photodiode. For the single pumping amplifier, two kinds of method are used which include a forward pumping structure for supplying a light source of an excitation wavelength by the WDM at the front stage of the EDF, and a reverse pumping structure for supplying the light source of an excitation wavelength by the WDM behind the EDF. Here, for the EDFA, the forward pumping structure uses a pump light of 980 nm with high gain and low noise, and is usually utilized for a preamplifier placed just preceding the reception stage in a communication means. The reverse pumping structure is mostly used for a power amplifier placed just preceding the transmission stage in the communication means because it amplifies a large signal to increase saturation output, using reverse ASE whose intensity is relatively large compared with forward ASE. In order to increase the magnitude of output power and gain, the two kinds of single pumping structure are mixed, as a double pumping structure. However, the double pumping amplifier used to increase output power needs two expensive pump laser diodes, increasing the overall cost of the EDFA. In case where the two pump laser diodes are used at the same time, their service life becomes shorter than when they are used alternately. Furthermore, if they are used in high-speed transmission network through the earlier EDFA, the gain of the transmitted light signal is reduced due to dispersion loss.

The Shibuy patent, U.S. Pat. No. 5,561,552, entitled Optical Fiber Amplifier Unit And Method For Supplying Excited Light Thereof, illustrates an optical fiber amplifier utilizing a pair of laser diode sources 5 and 6 which are affixed to a coupler having outputs fed to WDMs located on either side of the fiber amplifier which is split by an isolator disposed therebetween.

The Hadjifotiou patent, U.S. Pat. No. 5,355,248, entitled Optical Amplifier, illustrates an fiber amplifier 19 having power supplied from a pair of laser pump diodes 10 and 11 through couplers 13, 14, 16 and 17.

The following additional patents each disclose features in common with the present invention but are not as pertinent as the two patents discussed in detail above: U.S. Pat. No. 5,455,704 to Mizuochi et al, entitled Optical-Fiber Light Amplifier, U.S. Pat. No. 5,506,723 to Junginger, entitled Multistage Fiber-Optic Amplifier, U.S. Pat. No. 5,563,732 to Erdoganetal., entitled Laser Pumping Of Erbium Amplifier, U.S. Pat. No. 5,563,733 to Mitsuda et aL, entitled Optical Fiber Amplifier And Optical Fiber Transmission System, U.S. Pat. No. 5,623,362 to Mitsuda et al., entitled Erbium-Doped Fiber Amplifier And An Optical Fiber Communication System, U.S. Pat. No. 5,191,628 to Byron, entitled Optical amplifiers, U.S. Pat. No. 5,185,826 to Delavaux, entitled Hybrid Pumping Arrangement For Doped Fiber Amplifiers, U.S. Pat. No. 5,299,055 to Yoneyama, entitled Optical Fiber Amplifier Circuit Comprising A Control CircuitFor Controlling A Plurality Of Excitation Light Sources, U.S. Pat. No. 5,400,166 to Huber, entitled Communication Of Signals Sharing A single Optical Source, U.S. Pat. No. 5,510,926 to Bayart et al., entitled Transmission Method And An Optical Link Using Multiplexing With Application, U.S. Pat. No. 5,546,221 to Harasawa, entitled Optical Amplifier Apparatus, U.S. Pat. No. 5,598,491 to Ohya et al., entitled Optical fiber Amplifier And Optical Fiber Transmission Apparatus, U.S. Pat. No. 5,475,529 to Takatu et al., entitled Optical Amplifier, U.S. Pat. No. 5,430,572 to DiGiovanni et al., entitled High Power, High Gain, Low Noise, Two-Stage Optical Amplifier, and U.S. Pat. No. 54,57,568 to Jacobovitz Vesslka et al, entitled 980 NM Pumped Erbium Fiber Amplifier.

SUMMARY OF THE INVENTION

Therefore, it is an object of the present invention to provide an EDFA which is constructed to amplify an input light signal to a high-output light signal even with a single pump laser diode in a double pumping amplifier structure.

It is another object of the present invention to provide an EDFA which is constructed to compensate for the reduction of gain to dispersion loss, which is troublesome in high-speed transmission networks, by additionally installing a dispersion compensating fiber optic.

To accomplish the object of the present invention, there is provided an erbium doped fiber amplifier having one pumping source which outputs pump power so as to excite a light signal, the amplifier comprising: a first erbium doped fiber for receiving an excitation light signal input from the pumping source, and amplifying a transmitted light signal input from an input stage; a first wavelength division multiplexer located at an output of the first erbium doped fiber, for inputting the excitation light signal input from the pumping source to the first erbium doped fiber, the first multiplexer also receiving the transmitted light signal amplified from the first erbium doped fiber and outputting it to a next stage; a dispersion compensation fiber at an output of the first wavelength division multiplexer for compensating for loss caused due to the dispersion characteristics of the transmitted light signal; a second wavelength division multiplexer located at an output of the dispersion compensation fiber, for receiving the input transmitted light signal and the excitation light signal input from the pumping source at two input terminals and inputting the two signals to a second erbium doped fiber; and the second erbium doped fiber located at an output of the first wavelength division multiplexer for amplifying the transmitted light signal with the excitation light signal input.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a block diagram of EDFA having dispersion loss compensation fiber according to the present invention.

DETAILED DESCRIPTION OF THE PREFERRED EMBODIMENT

Hereinafter, preferred embodiments of the present invention are described with reference to the attached drawings. In the description of the present invention, related well-known functions or constructions will not be explained in detail if they possibly make the spirit of the present invention vague.

Figure 1:
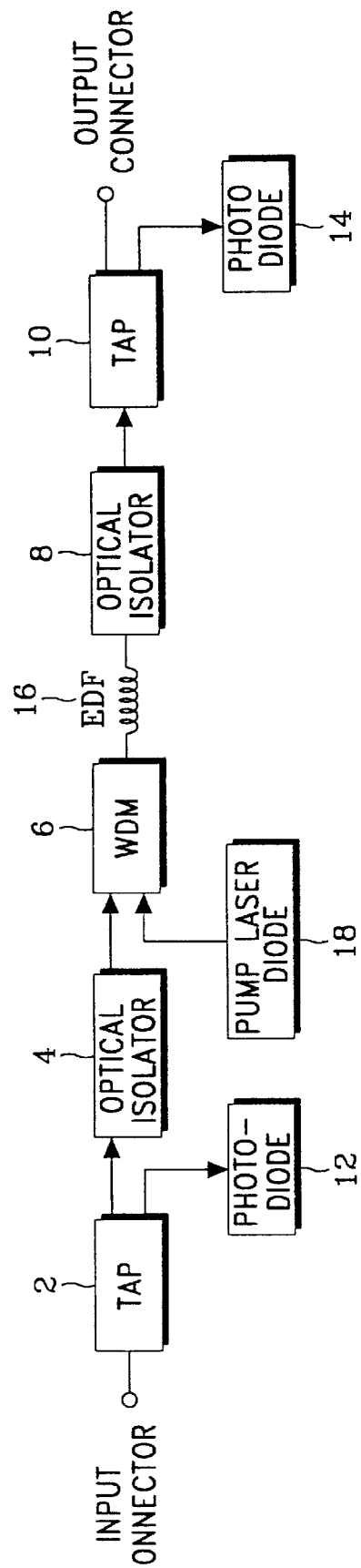
FIG. 1 is a block diagram of an earlier single pumping amplifier.
Figure 2:
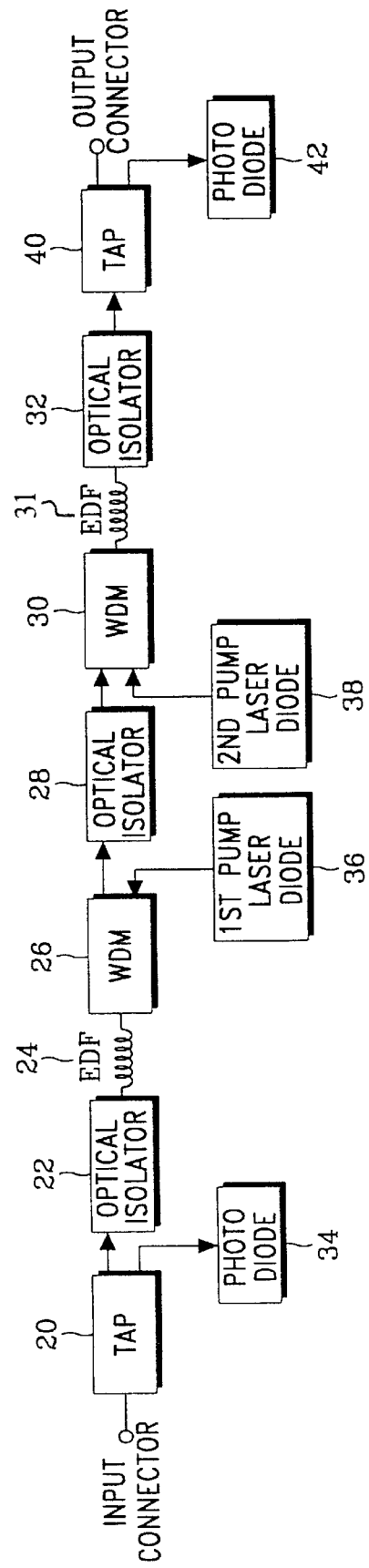
FIG. 2 is a block diagram of an earlier double pumping amplifier.

FIG. 1 is a block diagram of an earlier single pumping amplifier as discussed in the Description of the Related Art above and FIG. 2 is a block diagram of an earlier double pumping amplifier as also disclosed in the Description of the Related Art discussed above.

Referring to FIG. 1, an input connector which is connected to an external fiber optic cable is connected to a tap 2 having two outputs, one of which going to a photodiode 12 and the second of which going to an optical isolator 4. The output of the optical isolator 4 feeds a WDM 6 along with a pump laser diode 18. The output of the WDM 6 feeds an EDF 16 whose output is fed to another optical isolator 8 which in turn feeds another tap 10 having two outputs, one of which going to a photodiode 14 and the other going to an output connector.

Referring to FIG. 2, a tap 20 receives an input signal from the input connector and splits it into two outputs, one of which going to a photodiode 34 and the second of which going to an optical isolator 22 whose output feeds an EDF 24. The output of the EDF 24 feeds a WDM 26 which also receives a signal from a first pump laser diode 36.

The output of the WDM 26 feeds another optical isolator 28 whose output feeds another WDM 30 along with an output from a second pump laser diode 38. The output of the WDM 30 feeds another EDF 31 whose output feeds still another optical isolator 32 which in turn feeds another tap 40 which splits the input signal into two outputs one of which going to an output connector and the second of which going to another photodiode 42.

Figure 3:
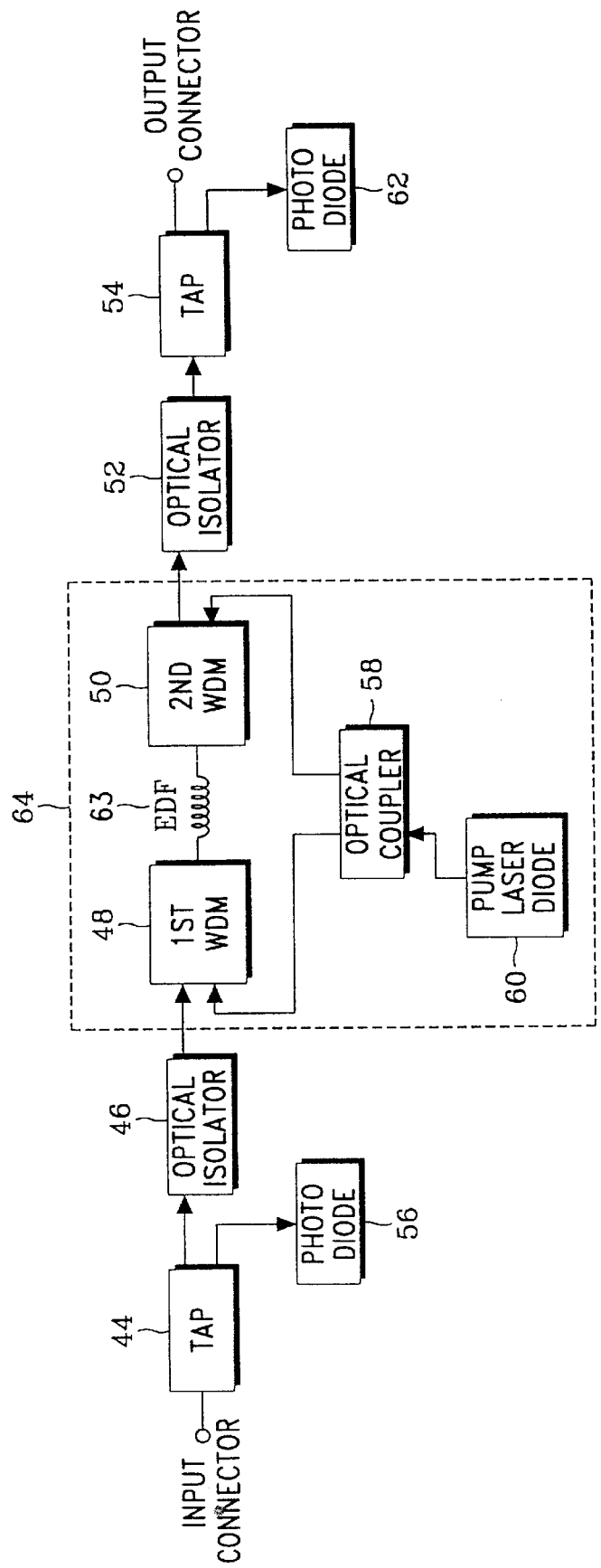
FIG. 3 is a block diagram of one embodiment of an EDFA of the present invention.

Referring to FIG. 3, an input connector connects an externally inserted fiber optic with an internal fiber optic of an EDFA. A separation tap 44 for splitting a light signal input via the fiber optic connected by the input connector at a predetermined ratio separates the transmitted light signal input, and feeds it to a first photodiode 56 and a first optical isolator 46. Here, the first photodiode 56 monitors the magnitude of the light signal input, and the first optical isolator 46 has one input terminal and one output terminal so as to interrupt the reverse flow of amplified spontaneous emission (ASE) generated from the behind an EDF 63 and prevent the light signal input from being distorted. The transmitted light signal passing through the first optical isolator 46 is input and amplified in the amplifier 64. The amplifier 64 includes a first WDM 48, second WDM 50, a pump laser diode 60, an optical coupler 58, and the EDF 63. The first WDM 48 receives the transmitted light signal input from first isolator 46, and an excitation light signal separated by the optical coupler 58, and outputs them forward via one end of the EDF 63. The second WDM 50, receiving a separated excitation light source from the optical coupler 58, outputs it reversely via the end of the EDF 63, and outputs the transmitted light signal finally amplified from the EDF. EDF 62, located between the first and second WDMs, receives the excitation light signal pumped in two directions via the two multiplexers, amplifies the transmitted light signal, and outputs it to the second WDM. Here, the wavelength of the transmitted light signal input is 1,550 nm, the wavelength of the excitation light source being 980 or 1,480 nm. The optical coupler 58 distributes light source pumped from the pump laser diode 60 to the first and second WDMs at he ratio of 50:50 or 40:60, 30:70. The output end of the EDF 63 is connected to optical isolator 52 which is then connected to a tap 54. The tap is connected to the output end fiber optic cable by the output connector. Here, optical isolator 52 interrupts the light signal reflected back from the tap or the connection of the output connector. The tap 54 receives the light signal output from the optical isolator 52, and splits it into a light signal output to the fiber optic cable connected via the output connector and a light signal for monitoring the output light signal. The monitoring light signal is monitored by photodiode 62.

According to the operation of the EDFA constructed as above, the transmitted light signal of 1,550 nm input via the input connector is input to the optical isolator 46 via the separation tap 44. Here, the intensity of the transmitted light signal separated by the separation tap 44 is detected by the photodiode 56. The transmitted light signal passing the optical isolator 46 is input as one input of the first WDM 48. The intensity of the light signal of 980 or 1,480 nm alternately pumped by the pump laser diode 60 is distributed at a predetermined ratio, fed as another input of the first WDM 48. The transmitted light signal and excitation light signal input via the two input terminals of the first WDM 48 are forward input to behind the EDF 63 and first amplified. The transmitted light signal is second amplified by the excitation light source input via the second WDM 50 connected behind the EDF, and output to the behind optical isolator 52 via the second WDM 50. Here, the excitation light signal input to the second WDM 50 is a signal distributed at a predetermined ratio s from optical coupler 58. As a result, the transmitted light signal input to the behind optical isolator 52 is finally output via the output connector. The photodiode 62 connected behind the separation tap 54 detects the intensity of the transmitted light signal amplified and output.

FIG. 4 shows another embodiment of the present invention, an EDFA with a dispersion compensation fiber (DCF). The transmitted light signal of 1,550 nm input via the input connector is input to an optical isolator 68 via a separation tap 66. Here, the intensity of the transmitted light signal separated by the separation tap 66 is detected by a photodiode 94. The transmitted light signal passing the optical isolator 68 is input to an EDF 88. Here, the transmitted light signal is first amplified by the excitation light source input, i.e., a light signal output from the pump laser diode 82, via first a WDM 70 connected behind the EDF, and then output to the dispersion compensation fiber (DCF) 92 via the first WDM 70. The excitation light signal input to first WDM 70 is a signal that is output from the pump laser diode 82 and is distributed at a predetermined ratio from an optical coupler 80. The transmitted light signal input to DCF 92 is compensated for dispersion loss, and then input as one input of a second WDM 72 and as another input of the second WDM 72 after being distributed at a predetermined ratio by the optical coupler 80. The transmitted light signal and excitation light signal input via the two input terminals of the second WDM 72 are input to an EDF 90 so as to be amplified and output. The transmitted light signal amplified and output is input to an optical isolator 76, and finally output via the output connector. Here, a photodiode 86 connected to a separation tap 78 monitors the intensity of the transmitted light signal amplified and output.

As described above, the present invention provides an EDFA structured to amplify a light signal to a high output even with a single pump laser diode in the double pumping amplifier, enhancing output power and allowing for the design of optical amplifier having a user-required performance. With dispersion compensation fiber additionally provided, the reduction of gain by dispersion loss, a troublesome problem to solve in a high-speed transmission network, is compensated for.

Figure 4A:
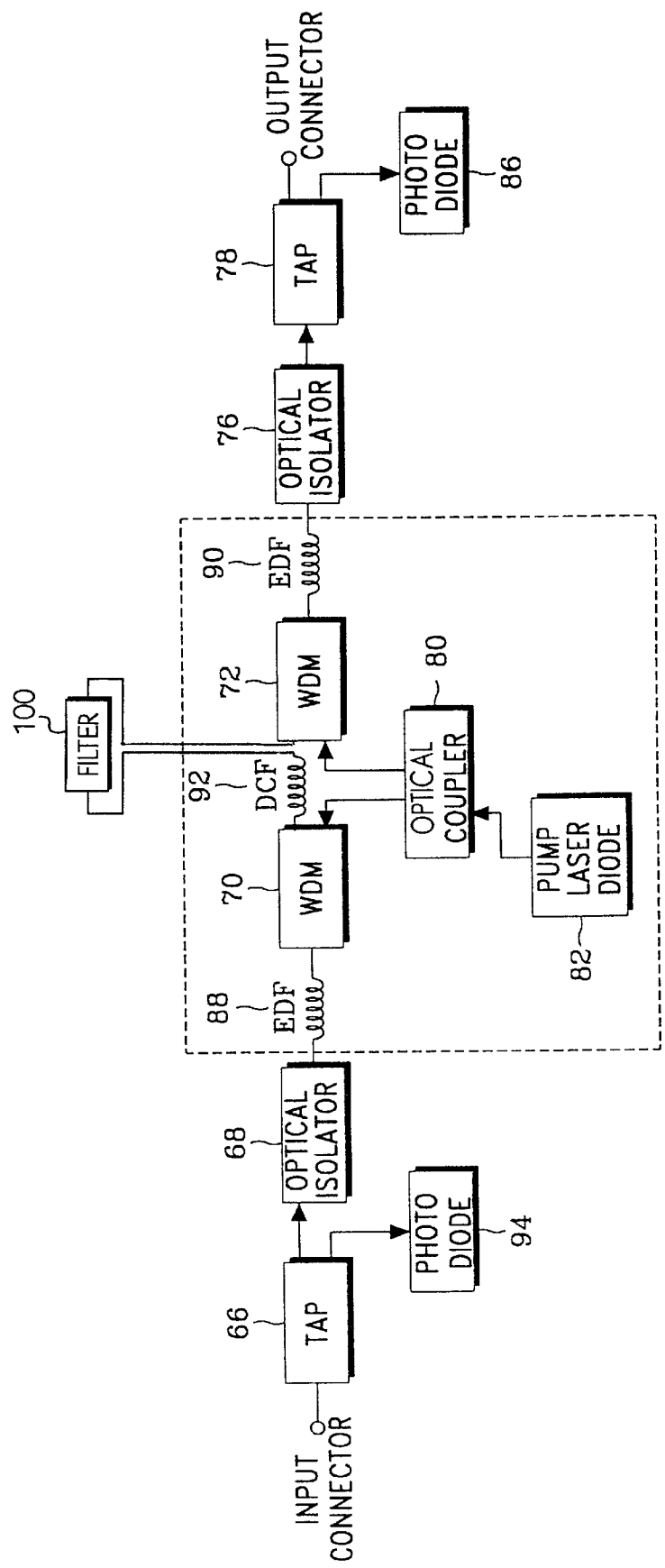
FIGS. 4A and 4B are block diagrams of alternative embodiments of the present invention.
Figure 4B:
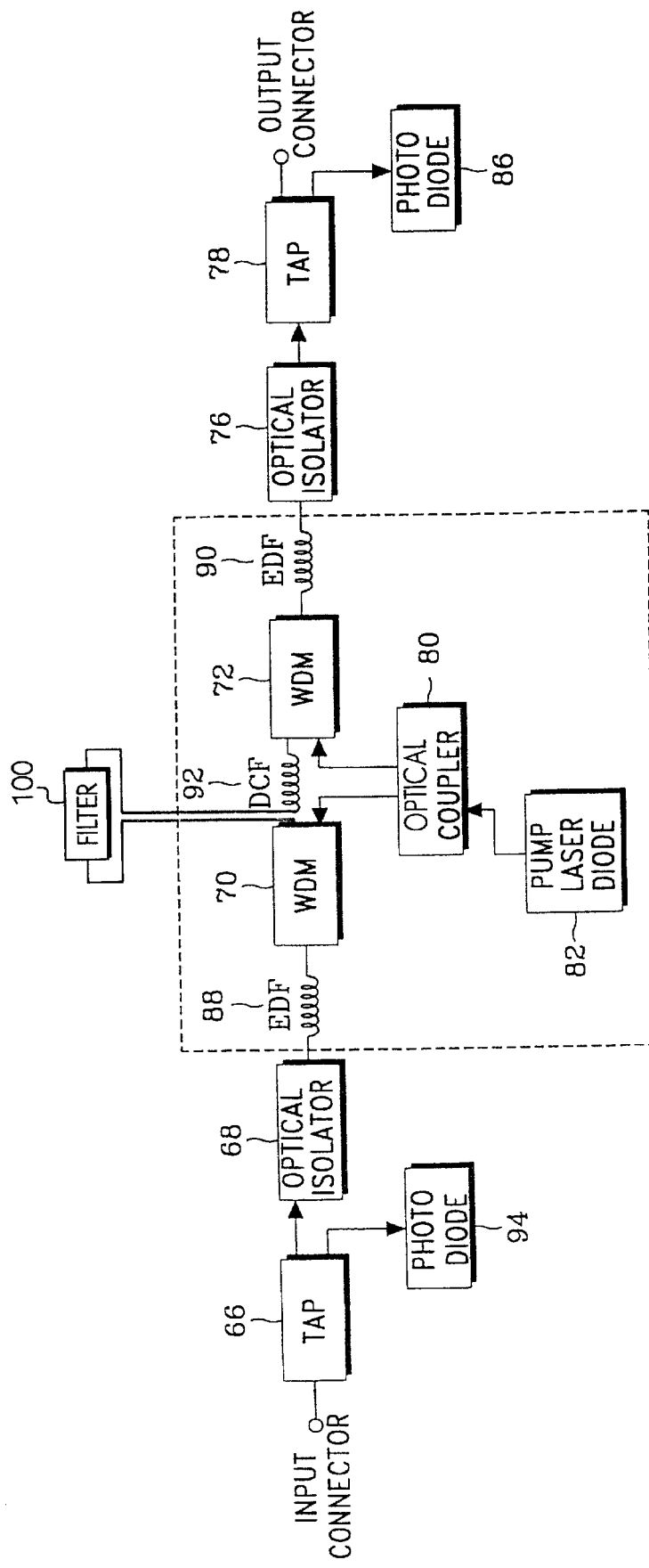

As other embodiments according to the present invention, the dispersion compensation fiber (DCF) 92 in a single pumping optical amplifier as shown in FIG. 4, may further comprise a variable filter 100 at an output stage thereof or at an input stage thereof, for outputting a transmitted light signal having a specific wavelength, thereby compensating for the dispersion characteristics of the transmitted light signal (see FIGS. 4A and 4B).

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An erbium doped fiber amplifier having one pumping source which outputs pump power so as to excite a light, the amplifier comprising:

a first erbium doped fiber for receiving an excitation light signal input from the pumping source, and amplifying a transmitted light signal input from an input stage;

a first wavelength division multiplexer located at an output of the first erbium doped fiber, for inputting the excitation light signal input from the pumping source to be first erbium doped fiber, the first multiplexer also receiving the transmitted light amplified from the first erbium doped fiber and outputting it to a next stage;

a dispersion compensation fiber at an output of the first wavelength division multiplexer for compensating for loss caused due to the dispersion characteristics of the transmitted signal;

a second wavelength division multiplexer located at an output of the dispersion compensation fiber, for receiving the input transmitted light signal and the excitation light signal input from the pumping source at two unput terminals and inputting the two signals to a second erbium doped fiber; and an n×n optical coupler for exciting an excitation light signal output from the pumping source at a 3:7 ratio in two directions and amplifying a transmitted light signal, said optical coupler transmitting the higher fraction of the power to said first wavelength division multiplexer and transmitting the smaller fraction of the power to said second wavelength division multiplexer;

the second erbium doped fiber located at an output of the first wavelength division multiplexer for amplifying the transmitted light signal with the excitation light signal input.

2. The amplifier as claimed in claim 1, further comprising:

optical isolators respectively installed ahead of the first wavelength division multiplexer and after the second wavelength division multiplexer in order to interrupt the reverse flow of proceeding light;

a pair of separation taps respectively located ahead of the first optical isolator and after the second optical isolator, for separating the transmitted light signal at a predetermined ratio in order to detect the magnitude of the transmitted light signal input; and a pair of photodiodes for respectively receiving monitoring light signals separated by the two separation taps and detecting the magnitude of the transmitted light signal input thereto.

3. The amplifier as claimed in claim 1, further comprising a filter located at an input stage of the dispersion compensation fiber, for filtering the transmitted light signal input so as to compensate for the dispersion of the transmitted light signal having a specific wavelength and for outputting only the transmitted light signal having a specific wavelength.

4. The amplifier as claimed in claim 1, further comprising a filter located at an output stage of the dispersion compensation fiber, for filtering the transmitted light signal input so as to compensate for the dispersion of the transmitted light signal having a specific wavelength and for outputting only the transmitted light signal having a specific wavelength.

5. The amplifier as claimed in claim 1, the one pumping source comprising a pump laser diode.

* * * * *